United States Patent Office 2,819,502
Patented Jan. 14, 1958

2,819,502
PROCESS FOR MAKING WELDING RODS

Jackson S. Snyder, Elizabeth, and Matthew F. Slowinski, Lake Hiawatha, N. J., assignors to Union Carbide Corporation, a corporation of New York No Drawing. Application October 5, 1955
Serial No. 538,759

3 Claims. (Cl. 22—200)

This invention relates to a process for the making of nodular cast iron welding rods.

Nodular cast iron has been known for some time and extensively described in the literature. Briefly, nodular cast iron is a material having a composition such that if cast without a nodulization treatment, gray cast iron will result. The nodulization treatment, performed prior to casting, comprises essentially adding a nodulizing agent, for example magnesium or cerium, to the iron. The effect of the nodulizing agent is to cause the formation on casting of nodules of graphite within the cast iron. This nodular cast iron has exhibited a greatly increased tensile strength as compared to conventional cast irons and has substantial ductility.

Because of its many desirable properties wide applications have been found for nodular cast iron. In some of these it has been found to be desirable to weld the material. Difficulties have been encountered in satisfactorily welding nodular cast iron without impairing its properties. The effectiveness of magnesium in inducing the formation of nodules of graphite rapidly diminishes upon the standing of treated iron in a molten condition. Similarly the effect of cerium fades or decreases when it is necessary to maintain cerium-containing iron in a molten condition for a substantial period of time. Since during welding the retention of the iron in a molten state for at least a while is necessary, this limitation can be seen to be a serious one.

Primarily, it is believed, because of this deterioration in physical properties, welding rods of the prior art made of nodular cast iron have been found to give brittle welds. Such brittleness being in sharp contrast to the properties of nodular cast iron seriously impairs the properties of a welded structure. Among the measures resorted to in an attempt to satisfactorily weld nodular cast iron are the use of special alloys and welding techniques. While some of these alloys and techniques have proved to be satisfactory, in most instances they necessitate the addition of materials foreign to nodular cast iron into the workpiece. Corrosion and strength problems ensue.

It is the principal object of the present invention to provide a welding rod suitable for the welding of nodular cast iron. More specifically it is the object of the invention to provide a welding rod such that weld metal deposited from the rod solidifies as nodular cast iron and tends to be similar in physical properties to the nodular cast iron being welded.

The objects of the invention are accomplished by providing a molten bath which if inoculated and cast would result in a gray cast iron; adding to said molten bath a quantity of cerium either as cerium metal or in the form of mischmetal; adding at or about the time of the cerium addition a quantity of sodium to the molten bath; inoculating the bath in a conventional manner and casting the molten material in the form of a welding rod. The inoculation may be effected either simultaneously with the addition of the cerium and sodium or subsequently as conditions and facilities dictate.

Welding rods made in the manner described above have proved to give soft ductile welds. Welds made with the welding rods made according to the process of the invention contain nodules of graphite of a size and in a quantity approximating that of the metal of the workpiece being welded. In contrast to these characteristics, with welding rods containing cerium and consisting of nodular cast iron made in a conventional manner and without the addition of the sodium as taught by the process of the invention, welds were found to contain very few nodules of graphite and exhibited extreme brittleness. These latter welds were unsuitable for use in most applications demanding nodular cast iron.

In an example of the process of the invention a bath of gray cast iron was prepared having a carbon content of 3.5% and less than 2% silicon. The temperature of the bath was brought up to approximately 2700° F. Into a ladle containing 0.1% by weight soduim metal and 0.5% mischmetal, a molten bath was introduced. Silicon was added to the molten bath in an amount sufficient to impart a silicon content of 3.5%. The molten material was then poured into molds and cast in the form of welding rods. Photomicrographs of the welding rods and metal deposited from the welding rods proved both to contain free graphite in nodular form. The weld was ductile and had physical properties similar to those of nodular cast iron in the workpieces welded.

No advantage has been found in adding cerium in an amount which results in a residual cerium content in excess of 0.30%. Not less than 0.1% cerium should be present in the rod to insure sufficient cerium in the weld deposits. The amount of silicon and carbon present in the rod may vary over a considerable range according to well established principles covering the manufacture of nodular cast iron. Best results have been obtained when not less than about 0.05% sodium is employed.

What is claimed is:

1. A process for the production of welding rods capable of depositing metal which solidifies as nodular cast iron, which process comprises providing a molten bath of cast iron which upon inoculation and casting would result in gray cast iron, adding cerium and sodium to said molten cast iron and, after inoculation, casting said cast iron in the form of welding rods.

2. A process as claimed in claim 1 wherein said cerium is added in an amount not less than 0.1% of the weight of the cast iron being treated and said sodium is added in an amount not less than 0.05%.

3. A process as claimed in claim 1 wherein said cerium is present in the form of mischmetal.

References Cited in the file of this patent

FOREIGN PATENTS 648,119  Great Britain _____ Dec. 10, 1952

OTHER REFERENCES

The Foundry Trade Journal, vol. 93, page 560. Nov. 13, 1952.